United States Patent [19]
Nemoto

[11] Patent Number: 5,506,833
[45] Date of Patent: Apr. 9, 1996

[54] PCA TRANSMISSION APPARATUS AND PCA TRANSMISSION METHOD

[75] Inventor: Nobuyuki Nemoto, Kawasaki, Japan

[73] Assignee: Fujitsu Limited, Kanagawa, Japan

[21] Appl. No.: 205,186

[22] Filed: Mar. 3, 1994

[30] Foreign Application Priority Data

Sep. 16, 1993 [JP] Japan .................... 5-229817

[51] Int. Cl.$^6$ .................... H04B 3/40
[52] U.S. Cl. .................... 370/16; 340/827
[58] Field of Search .................... 370/16, 13, 16.1, 370/14; 340/825.02, 825.01, 825.03, 827; 371/8.1, 8.2, 9.1, 11.1, 10.2, 10.3; 395/181

[56] References Cited

U.S. PATENT DOCUMENTS

| | | | |
|---|---|---|---|
| 4,656,645 | 4/1987 | Kaneko | 375/267 |
| 4,680,776 | 7/1987 | Ikeuchi et al. | 370/16 |
| 5,014,261 | 5/1991 | Shinbashi et al. | 370/16 |
| 5,069,521 | 12/1991 | Hardwick | 370/16 |

FOREIGN PATENT DOCUMENTS

0214497  3/1987  European Pat. Off. .
2220329  1/1990  United Kingdom .

*Primary Examiner*—Benedict V. Safourek
*Assistant Examiner*—Dang Ton

[57] ABSTRACT

A redundantly constructed protection channel access transmission apparatus includes current units and spare units by which protection channel access data can be transmitted even if any one of the current units or spare units is in an alarm state. In a normal state, the current units transmit work data and the spare units transmit the protection channel access data. When any one of the current units is in an alarm state, a selector selects work data and supplies the work data to a secondary spare unit. Then, the secondary spare unit performs a signal processing in place of the current unit. On the other hand, when any one of the spare units is in an alarm state, the selector also selects protection channel access data in the same way and the secondary spare unit performs a signal processing in place of the spare unit. With this arrangement, even if any one of the current units or spare units is in an alarm state, the secondary spare unit is selected and processes the signal of the current unit or spare unit in the alarm state, whereby both of the work data and protection channel access data can be transmitted as they are.

3 Claims, 11 Drawing Sheets

PCA TRANSMISSION APPARATUS AND PCA TRANSMISSION METHOD

BACKGROUND OF THE INVENTION

1. Field of the Invention

The present invention relates to a redundantly constructed PCA (Protection Channel Access) transmission apparatus having current units and spare units and a PCA transmission method, and more specifically, to a PCA transmission apparatus for and a PCA transmission method of transmitting other information by making use of spare units.

2. Description of the Related Art

During a redundantly constructed transmission apparatus is operated through current units, spare units are not used at all and thus there is a requirement that the spare units must be utilized effectively. Therefore, a PCA system is employed to transmit other information by making use of the spare units.

Figure 1:
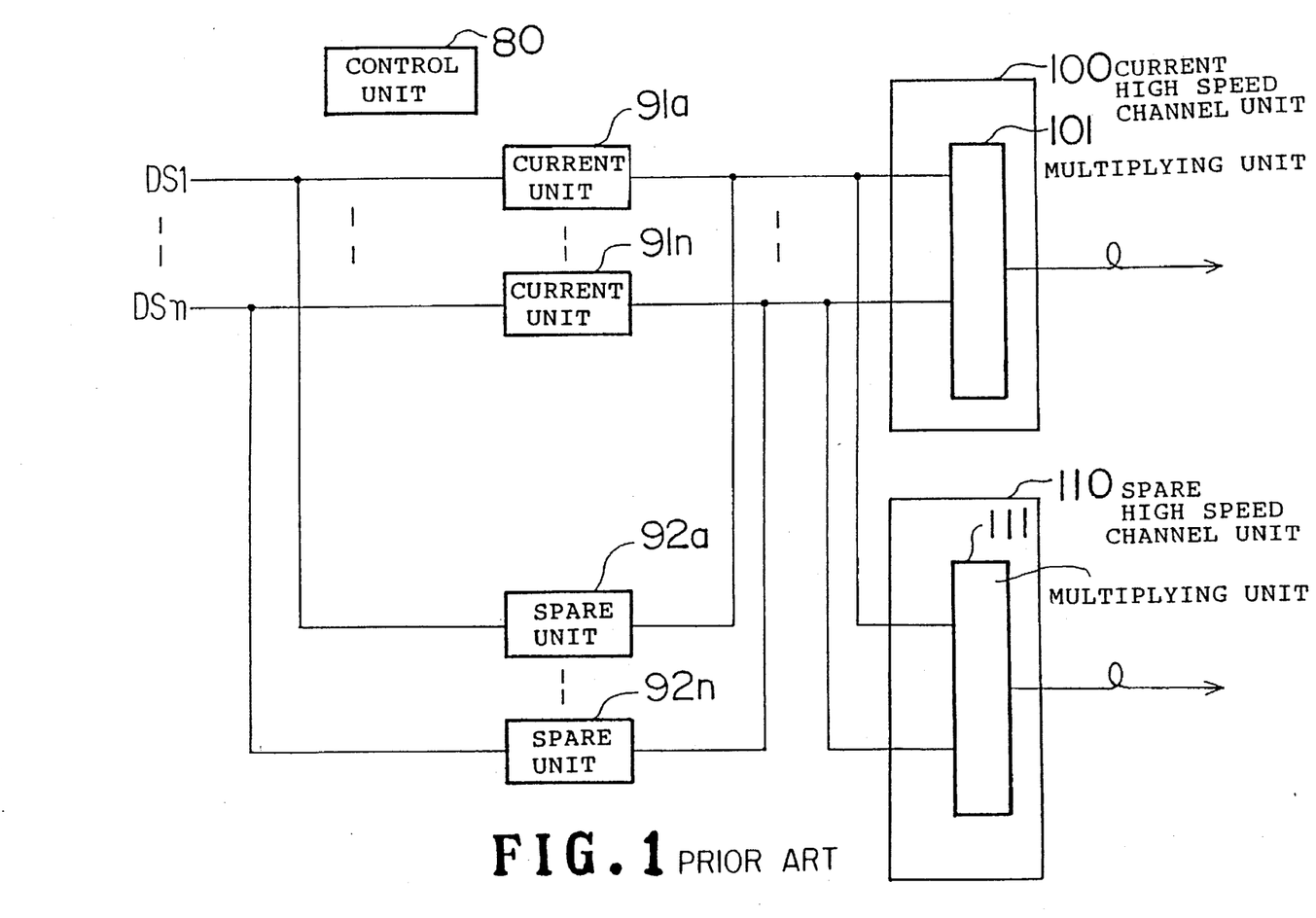
FIG. 1 is a block diagram showing the construction of a conventional transmission apparatus.

FIG. 1 is a block diagram showing the construction of a conventional transmission apparatus. There is, for example, a transmission apparatus for SONET (Synchronous Optical NETwork) as an example of this kind of the transmission apparatus. This transmission apparatus is composed of current units $91a-91n$, spare units $92a-92n$, a current high speed channel unit 100 and a spare high speed channel unit 110. The transmission apparatus also includes a control unit 80 composed of a microprocessor for monitoring and controlling these respective units. Although the control unit 80 is interconnected with the other units through an interface (microcomputer interface), respectively, these connections are not shown in FIG. 1.

First, data DS1–DSn of DS-3 format are input to the current units $91a-91n$ and the spare units $92a-92n$ and converted into signals of STS-1X3 format.

The control unit 80 monitors whether or not the current units $91a-91n$ and the spare units $92a-92n$ are in an alarm state, and when the current units $91a-91n$ are in a normal state, the outputs of the spare units $92a-92n$ are made to a high impedance state and separated.

Then, the data DS1–DSn are multiplied by the multiplying unit 101 of the current high speed channel unit 100 and further converted into optical signals and output.

Conversely, when the current unit $91a$ fails and is in an alarm state, the control unit 80 is aware of this state through the interface and makes the output of the current unit $91a$ to a high impedance state and separates the same and returns the output of the spare unit $92a$ from a high impedance state to a usual output. With this arrangement, the spare unit $92a$ is used in place of the current unit $91a$.

Further, when the current high speed channel unit 100 fails and is made to an alarm state, it may be switched to the spare high speed channel unit 110.

In this transmission apparatus, however, when the current units $91a-91n$ are in a normal state, the spare units $92a-92n$ are not used at all and they are wasted.

Therefore, the PCA transmission apparatus is used to transmit other information using the spare units $92a-92n$ in order to effectively utilize them.

In the PCA transmission apparatus, however, when any one of the current units is in an alarm state and one of the spare units corresponding to it is used, a problem arises in that PCA data cannot be transmitted.

SUMMARY OF THE INVENTION

An object of the present invention is to provide a PCA transmission apparatus by which PCA data can be transmitted even if any one of current units or spare units is in an alarm state.

Another object of the present invention is to provide a PCA transmission method by which PCA data can be transmitted even if any one of current units or spare units is in an alarm state.

A further object of the present invention is to provide a PCA transmission apparatus by which PCA data can be partially transmitted even if a plurality of current units fail.

To achieve the above objects, there is provided a redundantly constructed PCA transmission apparatus having current units and spare units. This PCA transmission apparatus comprises the current units for transmitting work data, the spare units for transmitting PCA data, a switching control unit for detecting alarm from the current units or the spare units, the switching unit being provided with a selector for selecting a line of the current units or the spare units, and a secondary spare unit for transmitting the work data or the PCA data when any one of the current units or the spare units fails.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, the outline of the present invention will be described.

Figure 2:
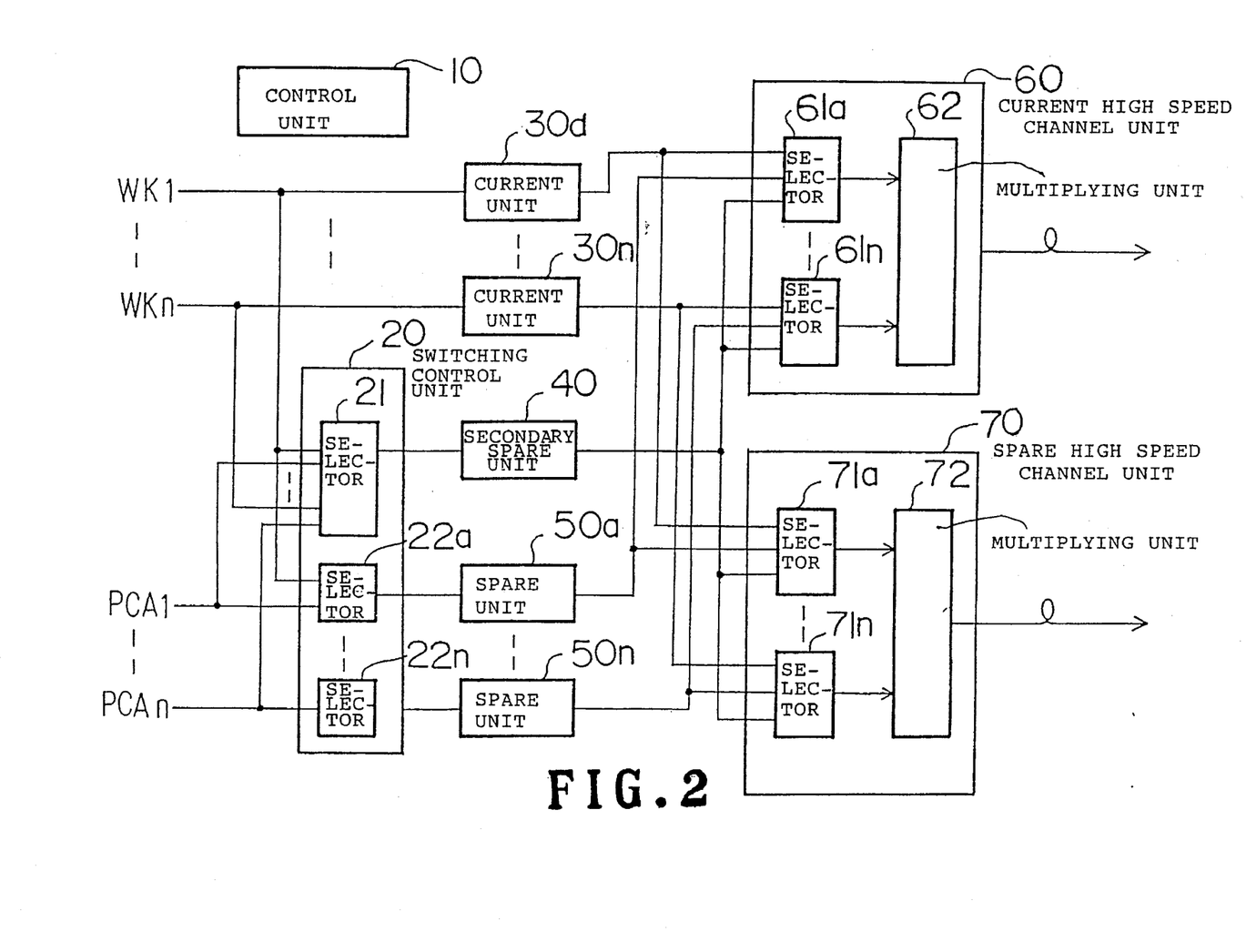
FIG. 2 is a block diagram showing the schematic construction of a PCA transmission apparatus according to the present invention.

FIG. 2 is a block diagram showing the construction of a PCA transmission apparatus according to the present invention. The PCA transmission apparatus includes current units $30a-30n$ for transmitting work data, spare units $50a-50n$ for transmitting PCA data and a switching control unit 20 for detecting alarm from the current units $30a-30n$ and the like provided with a selector 21 for selecting a line of the current units $30a-30n$.

The PCA transmission apparatus further includes a secondary spare unit 40 for transmitting work data WK1–WKn or PCA data PCA1–PCAn when the current units 30a–30n or the spare units 50a–50n fail.

In a normal state, the current units 30a–30n transmit the work data WK1–WKn and the spare units 50a–50n transmit the PCA data PCA1–PCAn.

For example, when the current unit 30a is in an alarm state, the selector 21 selects the work data WK1 and supplies the same to the secondary spare unit 40. Then, the secondary spare unit 40 performs a signal processing in place of the current unit 30a.

Further, when the spare unit 50a is in an alarm state, the selector 21 selects the PCA data PCA1 and the secondary spare unit 40 performs a signal processing in place of the spare unit 50a, in the same way.

As described above, even if any one of the current units and spare units is in an alarm state, the secondary spare unit is selected and the work data or PCA data are transmitted as they are.

Next, an embodiment of the present invention will be described in detail with reference to FIG. 2.

A transmission apparatus as shown in FIG. 2 can be used as a PCA transmission apparatus for, for example, SONET (Synchronous Optical NETwork). The PCA transmission apparatus is composed of a control unit 10, which controls the PCA transmission apparatus as a whole, the switching control unit 20, the current units 30a–30n, the spare units 50a–50n, the secondary spare unit 40, a current high speed channel unit 60 and a spare high speed channel unit 70.

The control unit 10, which controls the apparatus as a whole, detects the alarm state of the respective units to be described below and outputs a switching signal for switching the respective units. The control unit 10 has a case in which both of the work data WK1–WKn and PCA data PCA1–PCAn are made effective (PCA mode) and a case in which only the work data WK1–WKn are made effective (work mode). These modes are set by an operator.

The control unit 10 is composed of a microprocessor and interconnected to the respective units to be described below through an interface (microcomputer interface). However, these connections are omitted in FIG. 1.

The switching control unit 20 includes the selector 21 for selecting a signal from the work data WK1–WKn and PCA data PCA1–PCAn and selectors 22a–22n for selecting one of the work data WK1–WKn or one of the PCA data PCA1–PCAn which corresponds to each of the selectors. A signal for switching these selectors 21, 22a–22n is output when the control unit 10 is aware of the alarm state of the current units 30a–30n and the spare units 50a–50n through a not shown interface.

Further, the current units 30a–30n convert the work data WK1–WKn from a signal of DS-3 format into a signal of STS-1X3 format. In the same way, the spare units 50a–50n convert PCA data PCA1–PCAn from signals of DS-3 format into signals of STS-1X3 format. Note, as described below, the current units 30a–30n and spare units 50a–50n incorporate an alarm detection circuit and supply an alarm signal to the control unit 10 through an interface not shown.

Then, in a normal state, the work data WK1–WKn are input to a current high speed channel unit 60, multiplied by a multiplying unit 62 through selectors 61a–61n, and further converted from electric signals into optical signals by an E/O conversion circuit not shown and output as the optical signals. The selectors 61a–61n can select one of the signals from the current units 30a–30n, spare units 50a–50n and secondary spare unit 40 to achieve a switching function to be described below. A selected signal is of course output when the control unit 10 detects the alarm state of the current units 30a–30n and spare units 50a–50n.

In the same way, the PCA data PCA1–PCAn are input to a spare high speed channel unit 70, multiplied by a multiplying unit 72 through selectors 71a–71n, and further converted from electric signals to optical signals by an E/O conversion circuit not shown and output as optical signals. The selectors 71a–71n can select one of the signals from the current units 30a–30n, spare units 50a–50n and secondary spare unit 40 to achieve a switching function to be described below. A selected signal is of course output when the control unit 10 detects the alarm state of the current units 30a–30n and spare units 50a–50n.

Next, the respective units such as the control unit 10 and the like will be described in detail.

Figure 3:
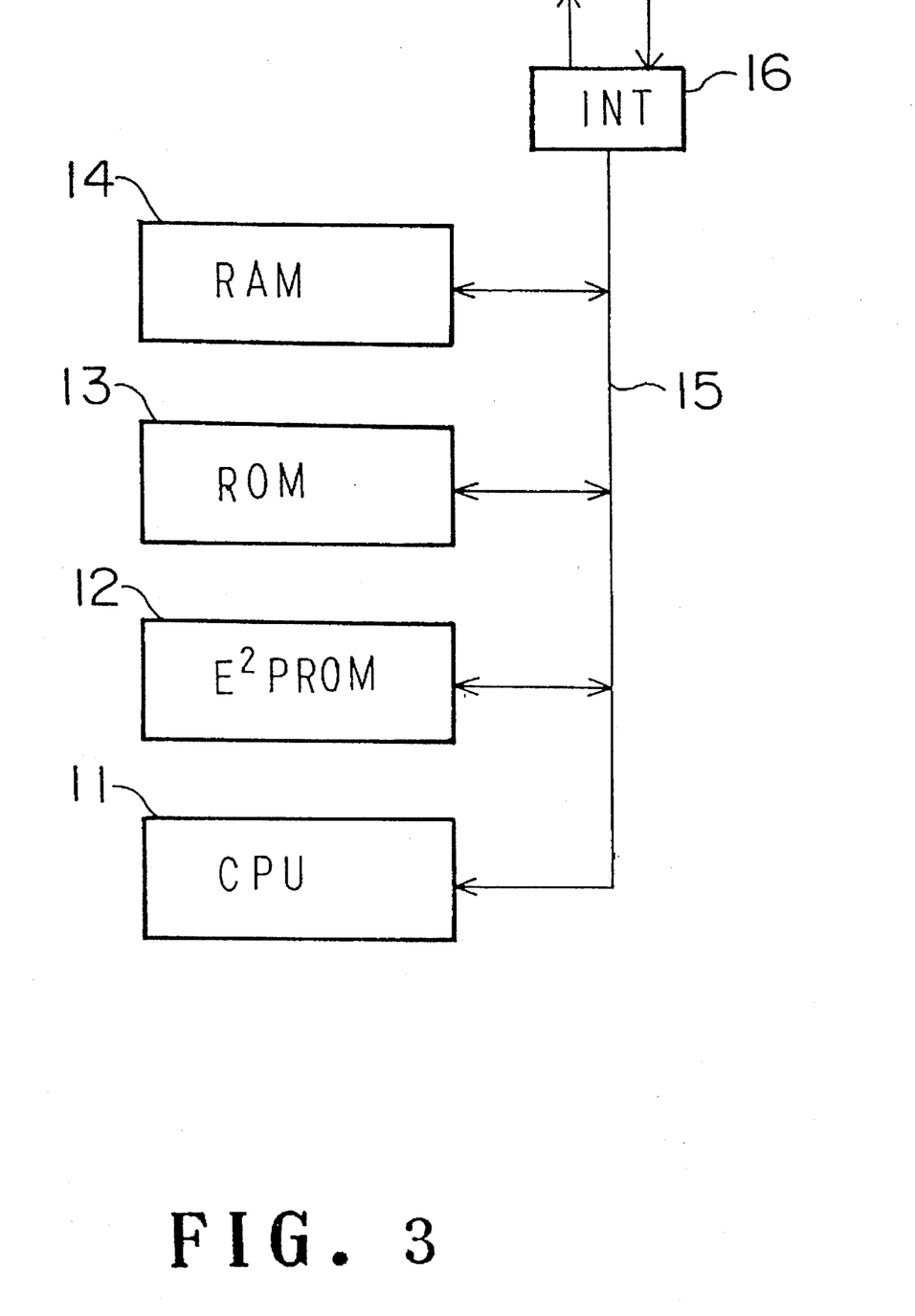
FIG. 3 is a block diagram of a control unit.

FIG. 3 is a block diagram of the control unit 10. The control unit 10 is composed of a processor 11, which serves as a central unit thereof, an $E^2PROM$ 12, a ROM 13 and a RAM 14, and they are interconnected through an internal bus 15. The $E^2PROM$ 12 stores data set to lines and the like. Further, the ROM 13 stores a program for controlling the control unit 10. The RAM 14 stores processing data which are needed temporarily. The internal bus 15 is connected to the switching control unit 20, current units 30a–30n, secondary spare unit 40, spare units 50a–50n, current high speed channel unit 60 and spare high speed channel unit 70 through an interface (microcomputer interface) (INT) 16. Then, the control unit 10 receives an alarm signal from the current units 30a–30n, secondary spare unit 40 and spare units 50a–50n and outputs a switching signal to the switching control unit 20, current high speed channel unit 60 and spare high speed channel unit 70.

Figure 4:
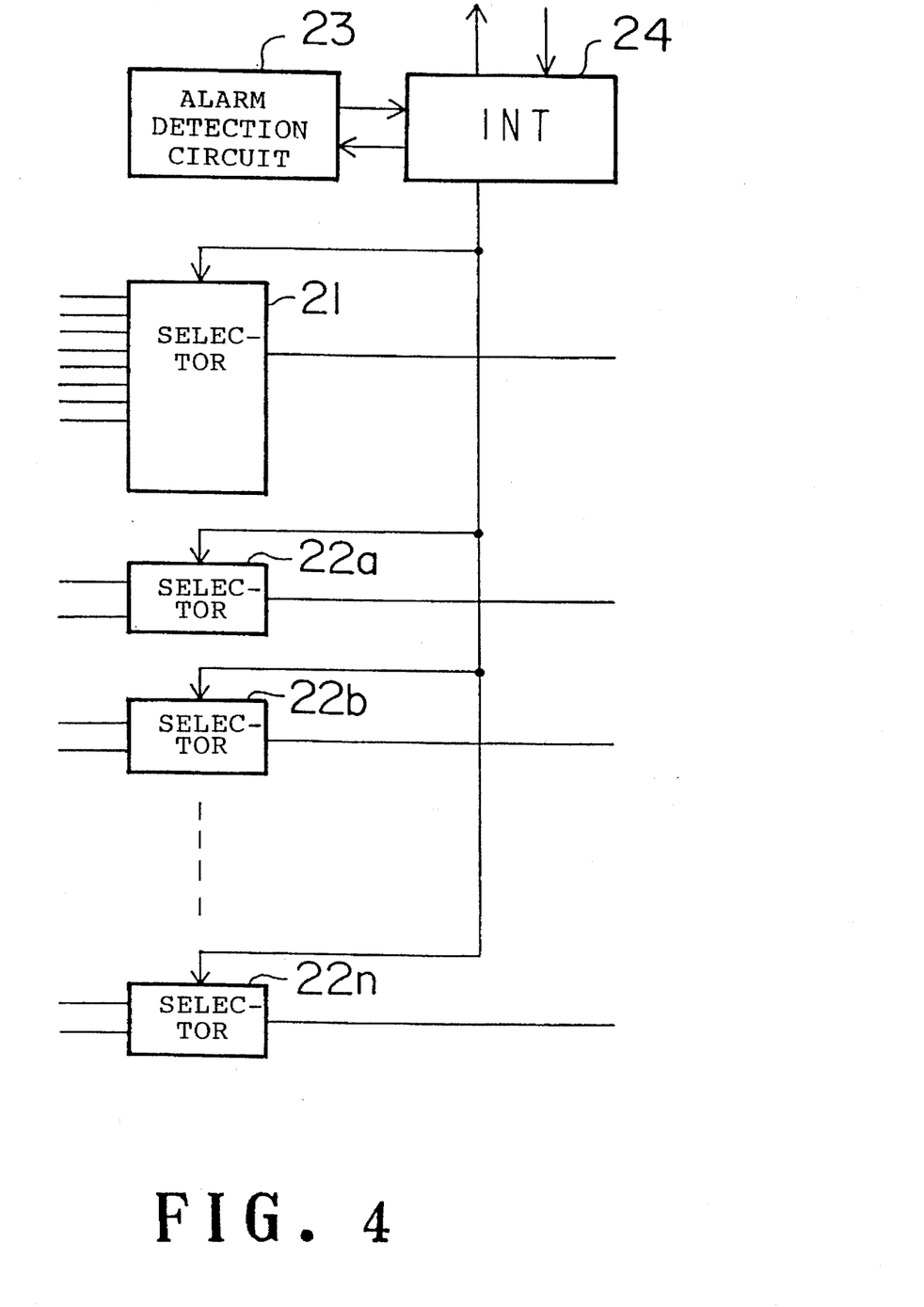
FIG. 4 is a block diagram of a switching control unit.

FIG. 4 is a block diagram of the switching control unit 20. The switching control unit 20 includes an alarm detection circuit 23 connected to an interface (INT) 24. When alarm is produced to the switching control unit 20, the alarm detection circuit 23 detects the alarm and supplies an alarm signal to the control unit 10 through the interface 24. Further, the selector 21 is connected to the interface 24 to select any one of the work data WK1–WKn and PCA data PCA1–PCAn in response to a switching signal from the control unit 10. As shown in FIG. 2, an output from the selector 21 is connected to the secondary spare unit 40.

Further, the selectors 22a–22n are connected to the interface 24. Each of the selectors 22a–22n has two inputs and selects one of the work data WK1–WKn or one of PCA data PCA1–PCAn and outputs the same. These selectors receive a switching signal from the control unit 10 through the interface 24.

Figure 5:
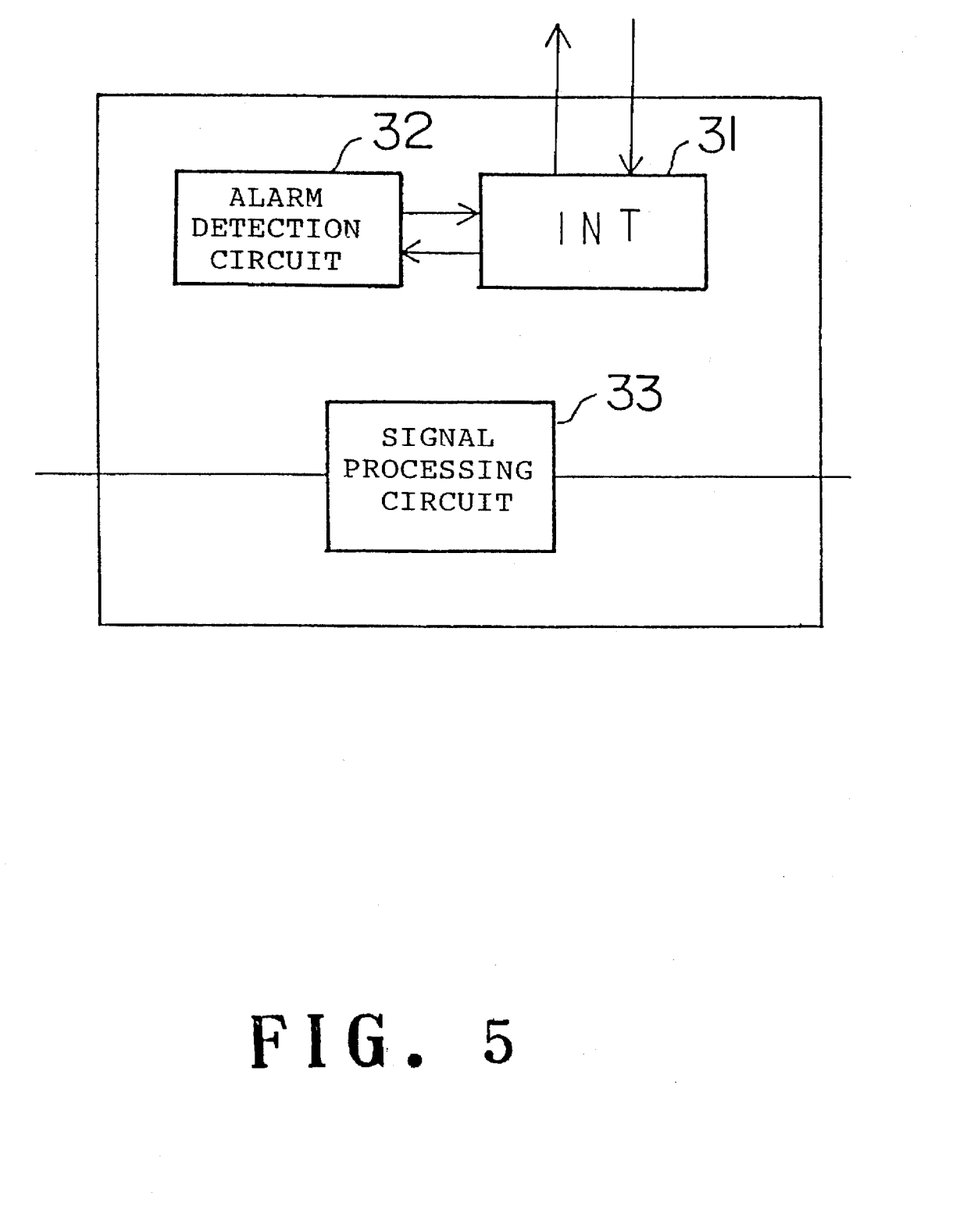
FIG. 5 is a block diagram of a current unit.

FIG. 5 is a block diagram of the current units 30a–30n. Since the spare units 50a–50n and the secondary spare unit 40 are constructed in the same way as the current units 30a–30n, the construction of the current units 30a–30n will be described.

Each of the current units has an alarm detection circuit 32 connected to an interface 31. When alarm is produced, the alarm detection circuit 32 detects the alarm and supplies an alarm signal to the control unit 10 through the interface 31. Further, each of the current units also includes a signal processing circuit 33 for converting input signals, for example, the work data WK1–WKn from signals of DS-3 format into signals of STS - 1×3 format.

Figure 6:
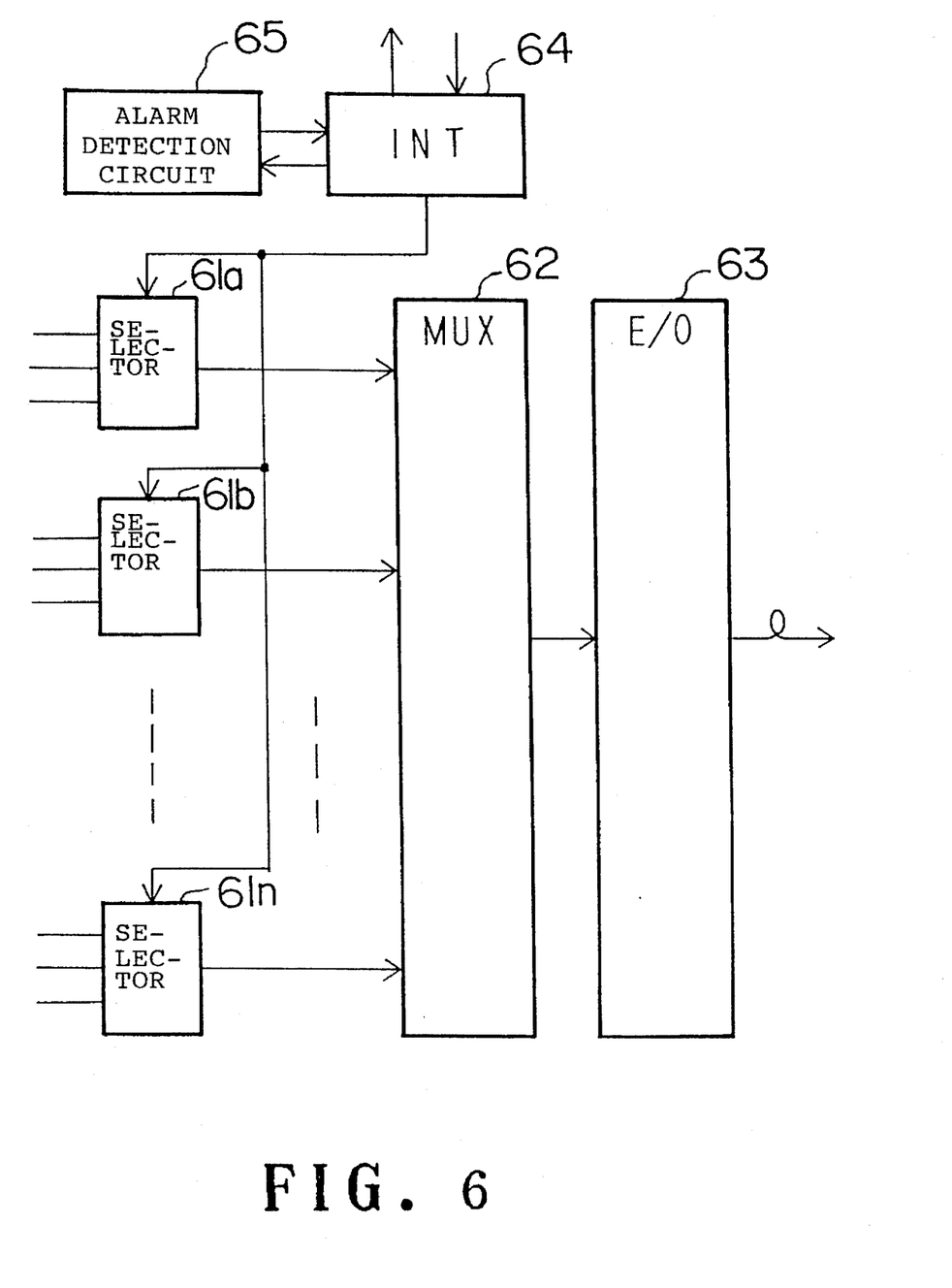
FIG. 6 is a block diagram of a current high speed channel unit.

FIG. 6 is a block diagram of the current high speed channel unit 60. Since the spare high speed channel unit 70 is constructed in the same way as the current high speed channel unit 60, the construction of the current high speed channel unit 60 will be described.

The current high speed channel unit 60 has an alarm detection circuit 65 connected to an interface (INT) 64, and when alarm is produced, the alarm detection circuit 65 supplies an alarm signal to the control unit 10. Further, the current high speed channel unit 60 switches the selectors 61a–61n in response to a switching signal from the control unit 10. Each of the selectors 61a–61n has three inputs so that it can select any one of the signals from the work data WK1–WKn, PCA data PCA1–PCAn and secondary spare unit 40.

An output from each of the selectors is multiplexed by the multiplexing circuit (MUX) 62 and converted from a signal of STS-1X12 format into a signal of STS-12 format. A multiplexed signal is converted into an optical signal by an E/O (electric/optical) conversion circuit 63 and then output.

Next, how the PCA transmission apparatus is used and a processing executed when alarm is produced will be described.

First, a case will be described in which work data are set and only the work data WK1–WKn are transmitted in a normal state.

Figure 7:
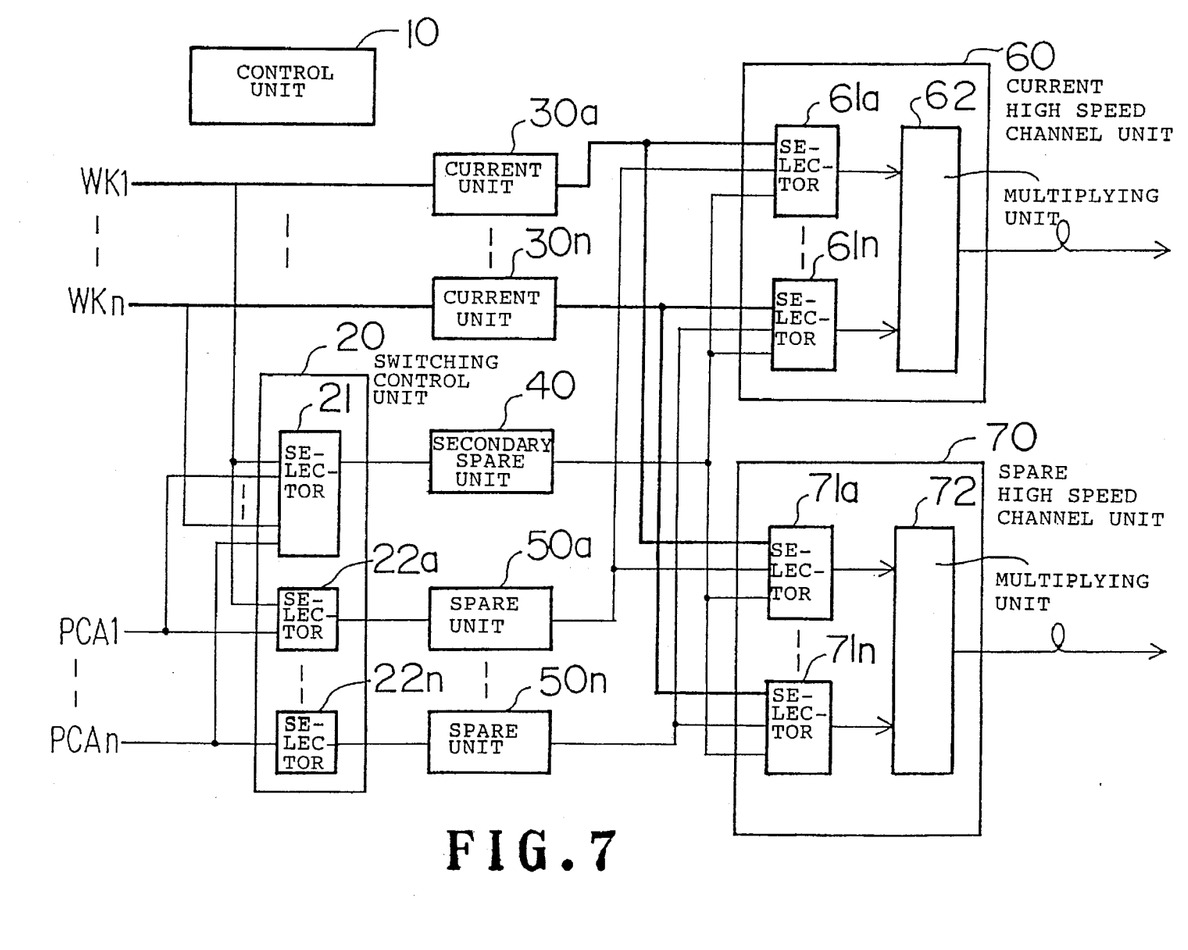
FIG. 7 is a diagram showing the flow of signals when work data is transmitted in a normal state in a work mode.

FIG. 7 is a diagram showing the flow of signals when the work data WK1–WKn are transmitted in a normal state in the work mode. Normally transmitted signals pass through thick lines in FIG. 7.

First, the work data WK1–WKn are input to the current unit 30a–30n. Then, the work mode is set so that the control unit 10 transmits only the work data WK1–WKn and a switching signal is supplied from the control unit 10 to the switching control unit 20 to cause the selectors 21, 22a–22n to select the work data WK1–WKn.

Then, since the current units 30a–30n normally operate, no alarm signal is supplied to the control unit 10. Therefore, a switching signal is supplied from the control unit 10 to the current high speed channel unit 60 so that the selectors 61a–61n also select the inputs from the current units 30a–30n.

Note, the spare high speed channel unit 70 also selects inputs from the current units 30a–30n. If the high speed channel unit 60 fails, the spare high speed channel unit 70 performs the function of the current high speed unit in place of it.

Of course, the spare units 50a–50n and secondary spare unit 40 are not used in this state.

Figure 8:
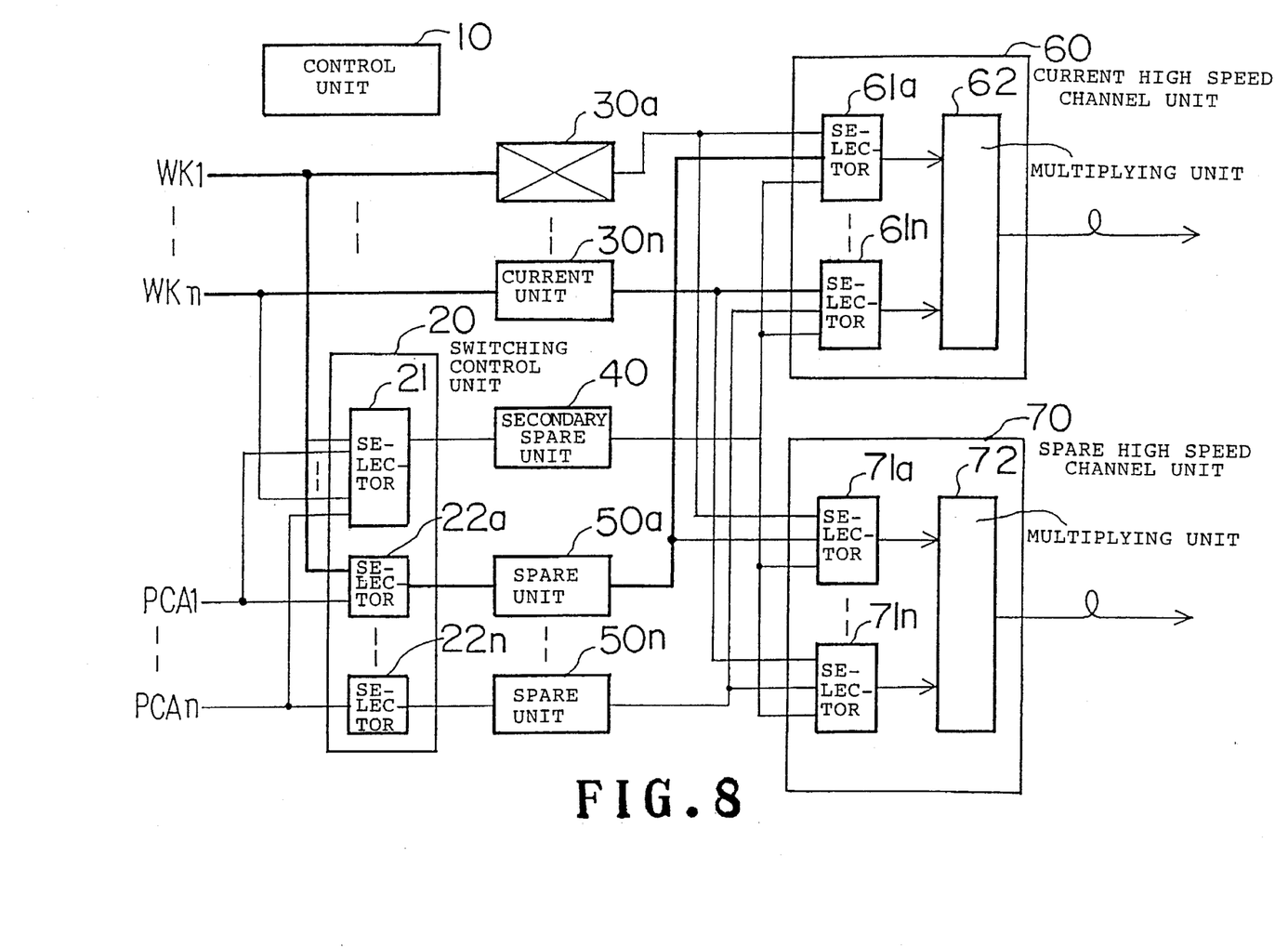
FIG. 8 is a diagram showing the flow of signals when alarm is produced to any one of current units in a work mode.

Next, a case will be described in which alarm is produced to one of the current units in the work mode. FIG. 8 is a diagram showing the flow of signals when alarm is produced to any one of the current units in the work mode. In FIG. 8, it is assumed that the current unit 30a is in a failed or abnormal state and alarm is produced. This alarm is supplied to the control unit 10. The control unit 10 supplies a switching signal to the switching control unit 20 to cause the selector 22a to select and output the work data WK1. Further, the control unit 10 supplies a selection signal to the current high speed channel unit 60 to cause the selector 61a to select an input from the spare unit 50a.

With this arrangement, the work data WK1 reaches the multiplexing circuit 62 through the selector 22a, spare unit 50a and selector 61a, as shown in FIG. 8. More specifically, the spare unit 50a operates in place of the current unit 30a. In the same way, when any one of the current units 30a–30n fails, one of the spare units 50a–50n corresponding to it operates as the failed current unit.

Figure 9:
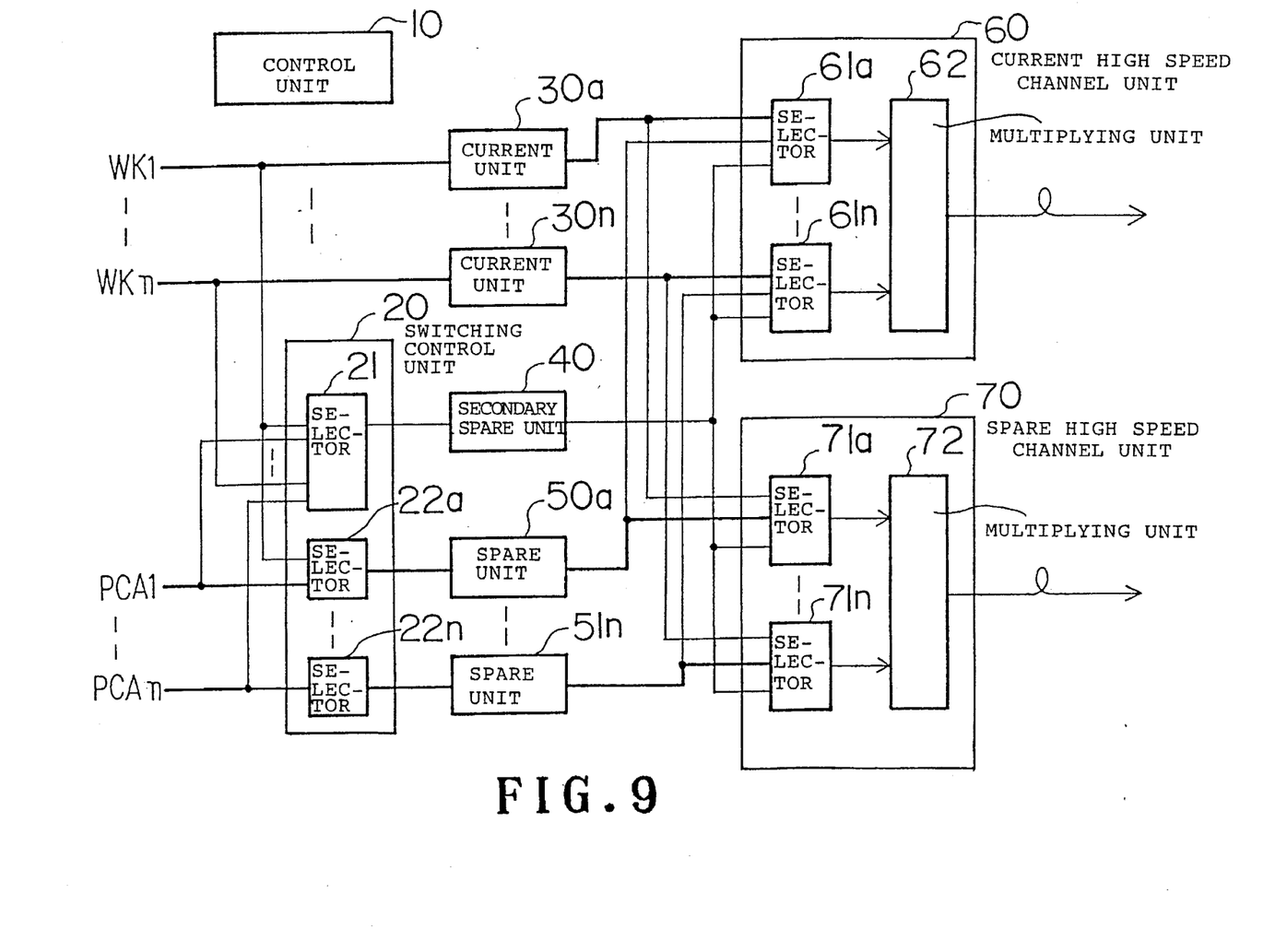
FIG. 9 is a diagram showing the flow of signals in a normal state in a PCA mode.

Next, a case will be described in which both of the work data and PCA mode are used in a normal state in the PCA mode. FIG. 9 is a diagram showing the flow of signals which are in the normal state in the PCA mode. The control unit 10 is set to the PCA mode and both of the work data WK1–WKn and PCA data PCA1–PCAn are transmitted. Since the current units 30a–30n are in the normal state and produce no alarm signal, the control unit 10 supplies a switching signal to the switching control unit 20 to cause the selectors 22a–22n to select the PCA data PCA1–PCAn.

Then, the work data WK1–WKn are input to the current units 30a–30n. The PCA data PCA1–PCAn are input to the spare units 50a–50n through the selectors 22a–22n.

Further, the control unit 10 supplies a switching signal to the current high speed channel unit 60 to cause the selectors 61a–61n to select inputs from the current units 30a–30n. These selectors 61a–61n select an input from the current units 30a–30n in response to the switching signal.

On the other hand, the control unit 10 supplies a switching signal to the spare high speed channel unit 70 to cause the selectors 71a–71n to select a signal from the spare units 50a–50n. With this arrangement, the selectors 71a–71n select a signal from the spare units 50a–50n.

Therefore, the work data WK1–WKn are transmitted through the current units 30a–30n and current high speed channel unit 60. Further, the PCA data PCA1–PCAn are transmitted through the switching control unit 20, spare units 50a–50n and spare high speed channel unit 70.

Figure 10:
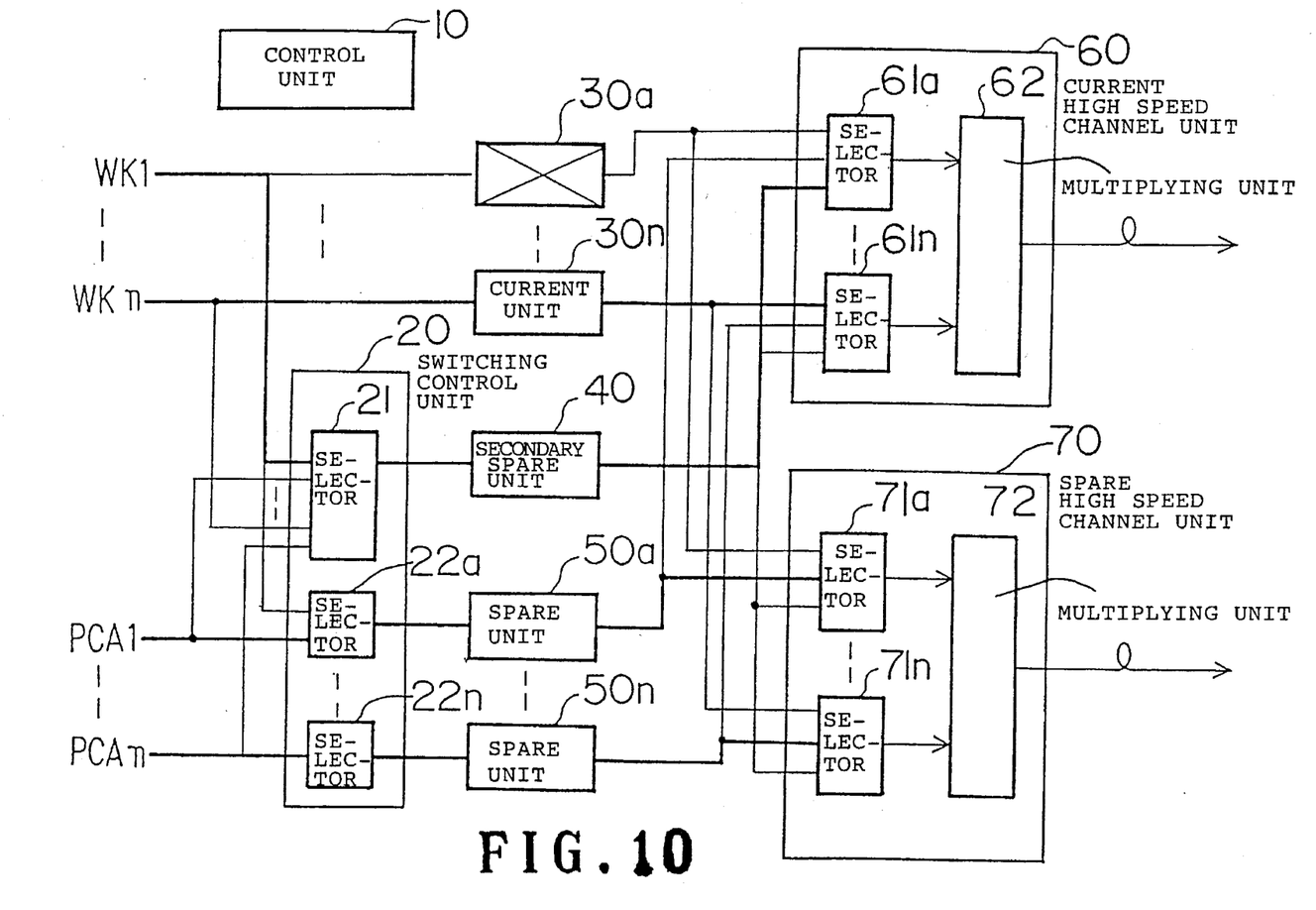
FIG. 10 is a diagram showing the flow of signals when any one of current units is in an alarm state in a PCA mode.

Next, a case will be described in which any one of the current units is in an alarm state in the PCA mode. FIG. 10 is a diagram showing the flow of signals when one of the current units is in the alarm state in the PCA mode, wherein it is assumed that the current unit 30a, for example, is in the alarm state. On receiving an alarm signal from the current unit 30a, the control unit 10 supplies a switching signal to the switching control unit 20 to cause the selector 21 to select the work data WK1. On receiving the switching signal, the selector 21 selects the work data WK1. Further, the control unit 10 supplies a switching signal to the current high speed channel unit 60 to cause the selector 61a to select an input from the secondary spare unit 40. The selector 61a selects the input from the secondary spare unit 40 in response to the switching signal.

Therefore, the work data WK1 is supplied to the multiplying circuit 62 through the selector 21, secondary spare unit 40 and selector 61a. With this arrangement, the secondary spare unit 40 performs the function of the current unit 30a in place of it. More specifically, even if the current unit 30a fails, not only the work data WK1–WKn but also PCA data PCA1–PCAn can be transmitted as they are.

Figure 11:
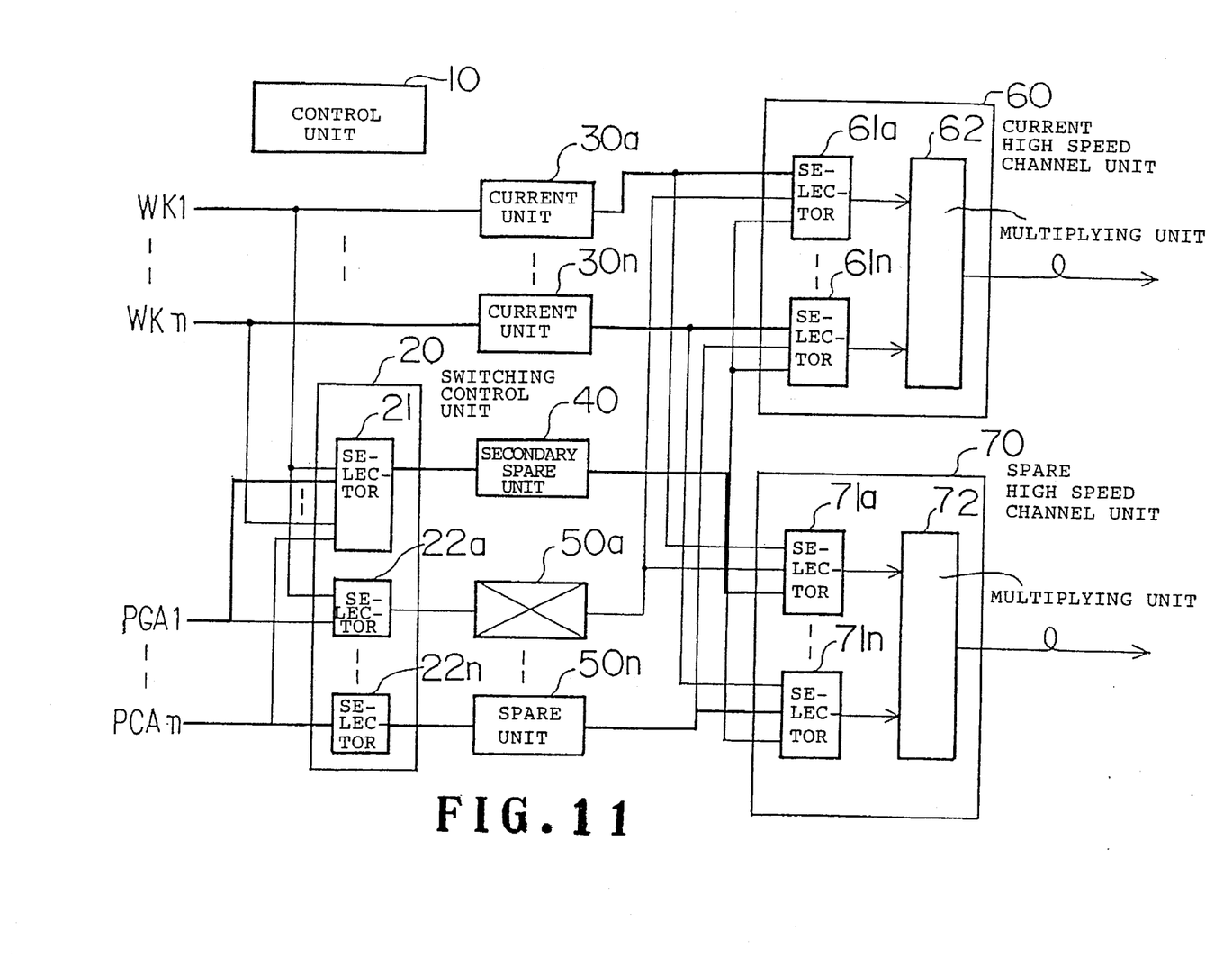
FIG. 11 is a diagram showing the flow of signals when any one of spare units is in an alarm unit in a PCA mode.

Next, a case will be described in which any one of the spare units fails in the PCA mode. FIG. 11 is a diagram showing the flow of signals when one of the spare units is an alarm state, wherein it is assumed that the spare unit 50a is in an alarm state in the PCA mode. On receiving an alarm signal from the spare unit 50a, the control unit 10 supplies a switching signal to the switching control unit 20 to cause the selector 21 to select the PCA data PCA1. On receiving the switching signal, the selector 21 selects the PCA data PCA1. Further, the control unit 10 supplies a switching signal to the spare high speed channel unit 70 to cause the selector 71a to select an input from the secondary spare unit 40. The selector 71a selects an input from the secondary spare unit 40 in response to the switching signal.

Therefore, the PCA data PCA1 is supplied to the multiplying unit 72 through the selector 21, secondary spare unit 40 and selector 71a. With this arrangement, the secondary spare unit 40 performs the function of the spare unit 50a in place of it. More specifically, even if the spare unit 50a fails, not only the PCA data PCA1–PCAn but also the work data WK1–WKn can be transmitted as they are.

Note, when, for example, two of the current units 30a–30n fail in the PCA mode, the secondary spare unit 40 is used first and further one of the spare units 50a–50n is used. With this arrangement, it is only one line that cannot transmit the PCA data PCA1–PCAn.

Note, although the only one secondary spare unit 40 is provided in the above example, a plurality of the secondary spare units may be provided to improve reliability.

As described above, according to the present invention, since the secondary spare unit is provided and used when any one of the current units and spare units is in an alarm state, even if any one of the current units and spare units fails, both of work data and PCA data can be transmitted as they are.

Further, even if a plurality of the current units are in an alarm state, the number of the PCA lines through which data cannot be transmitted can be reduced.

The foregoing is considered as illustrative only of the principles of the present invention. Further, since numerous modifications and changes will be readily occur to those skilled in the art, it is not desired to limit the invention to the exact construction and applications shown and descried, and accordingly, all suitable modifications and equivalents may be regarded as falling within the scope of the invention in the appended claims and their equivalents.

What is claimed is:

1. A redundantly constructed protection channel access transmission apparatus, comprising:

current units for transmitting work data;

spare units for transmitting protection channel access data;

a switching control unit for detecting alarm from any of said current units or said spare units, said switching unit being provided with a selector for selecting a line of said current units or said spare units;

a control unit for outputting a switching signal for switching a line of a failed one of said current units or said spare units to said selector in response to an alarm signal received from said current units or said spare units;

a secondary spare unit, coupled to said selector of said switching control unit, said selector switching a line of said current units or said spare units to said secondary spare unit so that said secondary spare unit transmits said work data or said protection channel access data when any one of said current units or said spare units fails, a current high speed channel unit for selecting and supplying an output from said secondary spare unit when any one of said current units fails; and a spare high speed channel unit for selecting and supplying an output from said secondary spare unit when any one of said spare units fails.

2. A protection channel access transmission apparatus according to claim 1, wherein said control unit makes said current high speed channel unit or said spare high speed channel unit select said secondary spare unit in response to an alarm signal from any one of said current units and said spare units.

3. A protection channel access transmission apparatus according to claim 1, wherein said switching control unit includes further selectors and when one of said current units is in an alarm state and further another one of said current units is also in an alarm state, one of said selectors selects one of said spare units in place of said another one of said current units.

* * * * *